United States Patent

[11] 3,575,463

| [72] | Inventor | George Kolevas<br>24 Lindsay St., Mac Leod, Victoria, Australia |
|---|---|---|
| [21] | Appl. No. | 720,581 |
| [22] | Filed | Apr. 11, 1968 |
| [45] | Patented | Apr. 20, 1971 |
| [32] | Priority | May 3, 1967 |
| [33] | | Australia |
| [31] | | 21186 |

[54] WINDSCREEN BONDING STRIPS
3 Claims, 4 Drawing Figs.

[52] U.S. Cl. ................................................ 296/93,
52/208, 161/88, 161/149, 156/60
[51] Int. Cl. ................................................ B60j 1/00
[50] Field of Search ................................................ 161/44, 43,
45, 88—98, 149, 118, 119, 124, 157; 156/107, 60;
52/208, 214, 397, 400, 403, 616, 620, 716;
49/475; 296/93

[56] References Cited
UNITED STATES PATENTS

| 2,313,508 | 3/1943 | Carman | 161/44X |
| 2,559,098 | 7/1951 | Walz | 161/44 |
| 2,733,789 | 2/1956 | Tolle | 161/45X |
| 2,766,055 | 10/1956 | Poltorak | 161/98X |
| 2,824,664 | 2/1958 | French et al. | 161/149UX |
| 3,018,208 | 1/1962 | Warner et al. | 161/157X |
| 3,288,667 | 11/1966 | Martin | 161/44 |
| 3,387,416 | 6/1968 | Martin | 52/208 |

Primary Examiner—William A. Powell
Attorneys—W. Bigelow Hall, Richard A. Wise and Cornelius A. Cleary

ABSTRACT: A bonding strip for a vehicle windscreen constituting an elongated body of butyl rubber substantially constant in cross section and having a fabric overlay adhered to part of the surface and extending throughout the effective length of the elongated body.

PATENTED APR 20 1971 3,575,463

Inventor
George Kolevas
By his Attorney
Cornelius H. Cleary

WINDSCREEN BONDING STRIPS

This invention relates to a bonding strip for a vehicle windscreen.

In installing a windscreen in a vehicle it is conventional practice to use a bonding strip, generally of rubber or other elastomeric material, and rectangular in cross section. Through use of such a strip the vehicle windscreen may be securely bonded to the metal body parts in a cushioned or resilient manner.

A material which has been enjoying considerable use in bonding strips is butyl rubber. In the uncured state, it may be provided in a tacky form which gives excellent adhesion between parts and at the same time is resilient contributing excellent cushioning effect. The shortcoming, however, is that the uncured butyl rubber composition tends to flow when compressed between the windscreen and the body or frame parts on fitting of the windscreen trim strip. The flow is irregular and often extends into the vision area of the windscreen to interfere with vision and to mar the appearance of the installed windscreen and is thus very undesirable. Several attempts have been made to overcome the problem. One involves fitting a sponge rubber element to the butyl rubber strip, and while that expedient does operate to limit flow of the butyl rubber strip material into the windscreen vision area, it also makes for a very expensive bonding strip.

It is accordingly the principal object of this invention to provide an improved bonding strip for installing a vehicle windscreen which contributes excellent bonding and cushioning to the windscreen, and in which the butyl rubber material of the strip is prevented from flowing into the vision area of the windscreen on installing.

That and other objects of the present invention are attained in a vehicle windscreen bonding strip comprising an elongated body of essentially uncured butyl rubber having a substantially constant cross section fabricated from an uncured butyl rubber and part of the surface of the body being adherently covered throughout its effective length with a fabric overlay. The overlay is so disposed when in assembly to prevent flowing of the body material into the vision area of a windscreen. Conveniently the bonding strip may be essentially rectangular in cross section with one side face thereof adherently covered with the fabric overlay. The covered face is that designed to be presented to the vision area of the windscreen when the windscreen is installed.

The elongated body making up the bonding strip is fabricated or produced from essentially uncured butyl rubber. Butyl rubber is a synthetic polymer produced by copolymerizing a large proportion of an olefin with a small proportion of a diolefin. Reaction conditions include generally a temperature below 150° F. and a Friedel-Crafts-type catalyst. The preferred butyl rubber for instant purposes is that which is a copolymer of isobutylene and 1.5 to 4.5 weight percent of isoprene. Because of the low amount of residual unsaturation the butyl rubber suffers little from chemical attack, and accordingly is well suited in that regard, even though maintained uncured, as a bonding medium for windscreens.

The butyl rubber may be plasticized with various petroleum oils, or by hot working with agents such as xylyl mercaptans. It may also include suitable fillers, e.g. carbon black, zinc oxide, etc. processing oil and other lubricants such as low molecular weight polyethylene and zinc stearate, and also other compatible elastomers such as polyisobutylene. In instances where it is desirable the inherent tack of the butyl rubber may be increased by the addition of oil soluble resins of low unsaturation. It may also be subjected to some amount of prevulcanization which may be facilitated through inclusion of dinitroso benzene.

The butyl rubber is used in essentially uncured state, where it exhibits desirable tackiness and adhesion characteristics with glass and metal surfaces. Similarly, in that state it is pliable and so lends itself to convenience in fitting and shaping around the periphery of the windscreen in conformation with the vehicle vehicle body or frame part in which the windscreen is installed.

The fabric overlay which is adhesively attached as part of the surface of elongated body of essentially uncured butyl rubber may be chosen from a large number of fabric materials. These include those based on textile fibers and filaments such as cotton, wool, and the various synthetics such as polyethylene terephthalate, nylon, polyvinylidene chloride, etc., and blends of the same, as well as glass fibers and filaments. The fabric preferred for use is sufficiently tightly woven so as to maintain in large extent its dimensions when subjected to installation. The tightness of fabric is also considered, from the standpoint that it be such that it be resistant to passage through of the butyl rubber material when the strip is subjected to installation.

As indicated previously the fabric overlay is adhesively attached to a side, or part of the surface of the butyl rubber body. That may be conveniently effected either by pressing the fabric, for example, a fabric tape onto an extruded body of the butyl rubber in convenient cross-sectional size and shape or, by extruding the butyl rubber body onto the tape.

With installation, the bonding strip is compressed between the windscreen glass and the surrounding body panelwork and the fabric overlay, for example, the fabric tape is set so that is follows the contour of the compressed bonding strip and presents a fabric face inwardly and essentially normal to the vision area of the windscreen. This serves to prevent the undesirable flow of the uncured butyl rubber, which would otherwise occur, and similarly provides a more attractive appearance.

Two illustrative embodiments of the invention will now be described with reference to the accompanying drawings in which.

Figure 1:
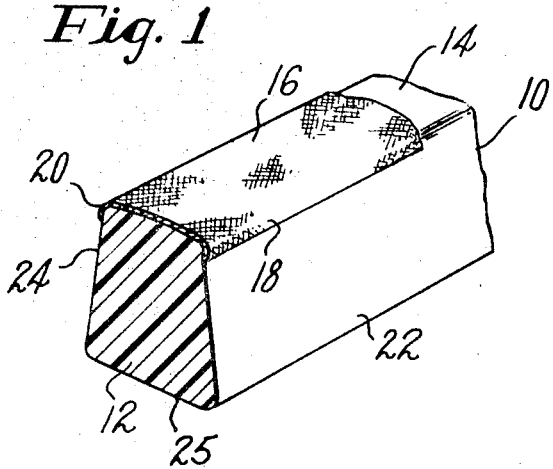
FIG. 1 is a perspective sectional view of a preferred embodiment of bonding strip in accordance with the invention.
Figure 2:
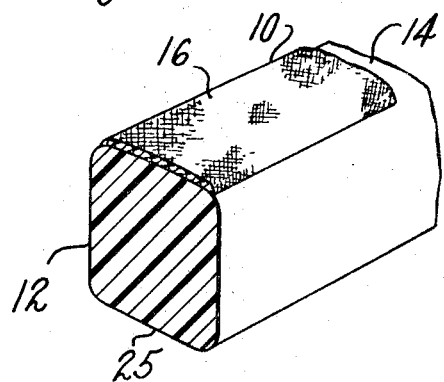
FIG. 2 is a perspective sectional view of a second embodiment of the bonding strip in accordance with the invention.

Referring now to the drawings, and first to FIGS. 1 and 2, the bonding strip generally referred to as 10 comprises an extruded body 12 of essentially uncured butyl rubber which is tacky in nature, and has a top side 14 adhesively attached to a woven cotton tape or other fabric overlay 16. In the arrangement shown in FIG. 1 the fabric overlay 16 includes skirting portions 18 and 20 which are adhesively attached for a short distance down the front side 22 and back side 24, respectively, of strip body 12 with the bottom side 25 of the strip body 12 remaining completely uncovered. In the alternative embodiment shown in FIG. 2 the fabric overlay merely covers the top side 14 of a substantially rectangular strip body 12.

As indicated previously, the adhered fabric overlay 16 extends throughout the length of strip 10, as illustrated throughout the length of top side 14, and serves the additional function of preventing stretching and general deformation of the strip prior to and during installation, which could otherwise take place because of the plastic flow properties of uncured butyl rubber constituting the strip body 12.

Figure 3:
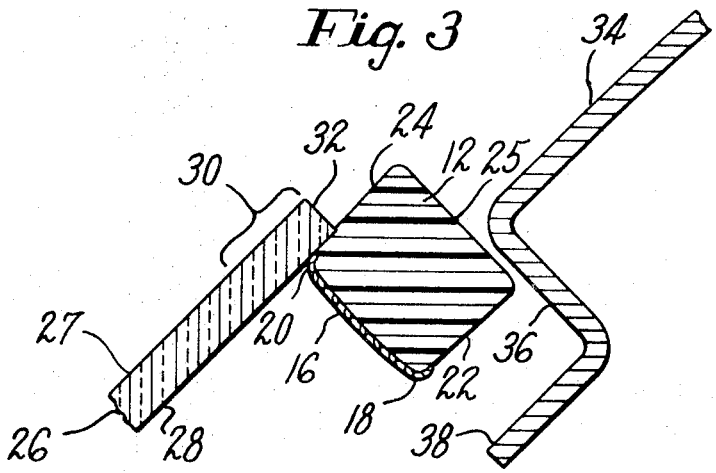
FIG. 3 is a diagrammatic sectional end view with parts broken of a partial assembly taken during installing of a windscreen to a vehicle frame member.

As shown in FIG. 3, in use, the strip 10 is laid against the windscreen 26, shown with respect to an outside surface 27 and inside surface 28, and specifically against the inside surface 28 at the peripheral portion 30 of the windscreen 26 so that it extends beyond the leading edge 32. In doing so, the fabric overlay 16 is positioned back from and faces inwardly from leading edge 32. As shown in that FIG. too, a vehicle frame member 34 is in a bent configuration to provide a pair of strip-receiving surfaces 36 and 38 normal to one another. The one surface 36 is designed to receive the side 12 of strip 10 and the other surface 38 to receive the side 22 of strip 10.

Figure 4:
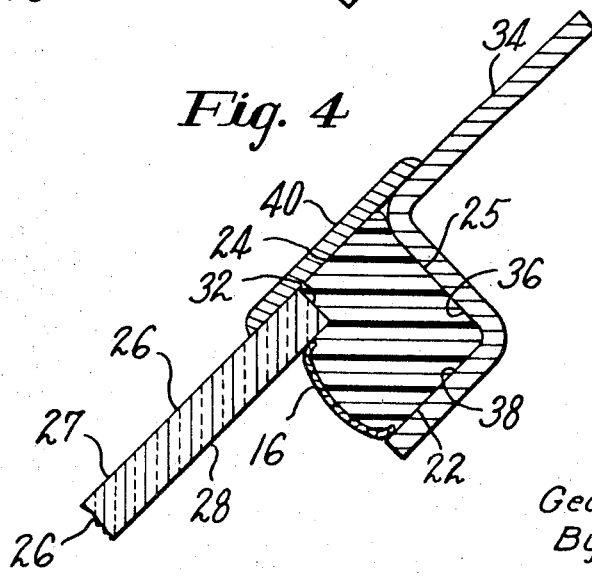
FIG. 4 is a view similar to that of FIG. 3 but taken after the bonding strip is installed in its intended position.

FIG. 4 illustrates the windscreen 32 adhesively attached to the frame 34 through the bonding strip 10. As a result of the relationship between the dimensions of those various parts, the strip 10 is deformed during assembly, and the butyl rubber body 12 is caused to flow and to substantially fill the recess otherwise defined by surfaces 36 and 38 of the frame 34. A decorative trim strip 40 is located and becomes adhesively attached to the side 24 of the strip 10 which has flowed outward with assembly and installation to fill that part of the recess which would otherwise be defined between the surface 36 of the frame member 34 and the leading edge 32 of the windscreen 26. The trim strip then bridges the frame 34 and the windscreen 26 externally of the same. The fabric overlay 16 by virtue of its final disposition indicated earlier with respect to FIG. 3, provides an effective barrier to flow of the uncured butyl rubber along the inner surface 28 of the windscreen 26 both during and after assembly. The flow which would otherwise occur would reduce the viewing surface provided by windscreen 12.

The embodiment of the bonding strip shown in FIGS. 1, 3 and 4 of the drawings is preferred, however, the simpler embodiment shown in FIG. 2 is quite effective in the application under consideration.

It will thus be seen that the objects set forth above, among those made apparent from the preceding description, are efficiently attained and, since certain changes may be made in the above windscreen bonding strip without departing from the scope of the invention, it is intended that all matter contained in the above description or shown in the accompanying drawing shall be interpreted as illustrative and not in a limiting sense.

I claim:

1. In a vehicle assembly comprising a windscreen installed in spaced relationship with a vehicle frame member through an interposed bonding strip including an elongated body essentially of uncured butyl rubber material, the improvement which comprises a fabric overlay adhesively attached directly to the surface of said elongated body which extends between a viewing surface of the windscreen and the frame member, said fabric being sufficiently tightly woven to resist passage therethrough of the butyl rubber material to thereby prevent flow of the butyl rubber material onto the viewing surface of the windscreen.

2. In a vehicle assembly according to claim 1 wherein the body material is of substantially rectangular cross section and a side is covered by the adhesively attached fabric overlay.

3. In a vehicle assembly according to claim 1 wherein the fabric overlay is a woven cotton tape.